(12) United States Patent
Malik

(10) Patent No.: US 7,996,471 B2
(45) Date of Patent: Aug. 9, 2011

(54) ELECTRONIC MESSAGE DISTRIBUTION SYSTEM

(75) Inventor: Dale W. Malik, Dunwoody, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 981 days.

(21) Appl. No.: 10/889,741

(22) Filed: Jul. 13, 2004

(65) Prior Publication Data
US 2006/0031328 A1    Feb. 9, 2006

(51) Int. Cl.
G06F 15/16    (2006.01)
G06Q 40/00    (2006.01)

(52) U.S. Cl. ......... 709/206; 709/203; 709/207; 705/35

(58) Field of Classification Search ............ 709/206
See application file for complete search history.

(56) References Cited

U.S. PATENT DOCUMENTS

| | | | |
|---|---|---|---|
| 5,508,731 A | 4/1996 | Kohorn | |
| 5,564,048 A | 10/1996 | Eick et al. | |
| 5,675,733 A * | 10/1997 | Williams | 709/206 |
| 5,697,844 A | 12/1997 | Von Kohorn | |
| 5,742,763 A | 4/1998 | Jones | |
| 5,759,101 A | 6/1998 | Von Kohorn | |
| 5,826,039 A | 10/1998 | Jones | |
| 5,832,221 A | 11/1998 | Jones | |
| 5,862,325 A | 1/1999 | Reed et al. | |
| 5,892,909 A | 4/1999 | Grasso et al. | |
| 5,916,024 A | 6/1999 | Von Kohorn | |
| 6,049,819 A | 4/2000 | Buckle et al. | |
| 6,052,709 A * | 4/2000 | Paul | 709/202 |
| 6,088,717 A | 7/2000 | Reed et al. | |
| 6,112,181 A | 8/2000 | Shear et al. | |
| 6,185,599 B1 | 2/2001 | Salimando et al. | |
| 6,345,288 B1 | 2/2002 | Reed et al. | |
| 6,443,840 B2 | 9/2002 | Von Kohorn | |
| 6,473,794 B1 | 10/2002 | Guheen et al. | |
| 6,519,571 B1 | 2/2003 | Guheen et al. | |
| 6,536,037 B1 | 3/2003 | Guheen et al. | |
| 6,546,416 B1 * | 4/2003 | Kirsch | 709/206 |
| 6,606,744 B1 | 8/2003 | Mikurak | |
| 6,615,166 B1 | 9/2003 | Guheen et al. | |
| 6,629,081 B1 | 9/2003 | Cornelius et al. | |
| 6,658,568 B1 | 12/2003 | Ginter et al. | |
| 6,671,818 B1 | 12/2003 | Mikurak | |
| 6,721,713 B1 | 4/2004 | Guheen et al. | |
| 6,757,710 B2 | 6/2004 | Reed | |
| 2002/0007301 A1 * | 1/2002 | Reuning | 705/9 |
| 2003/0028495 A1 * | 2/2003 | Pallante | 705/78 |

(Continued)

OTHER PUBLICATIONS

Denny; U.S. Appl. No. 11/283,458, filed Nov. 18, 2005.

(Continued)

*Primary Examiner* — Phuoc Nguyen
*Assistant Examiner* — Kishin G Belani
(74) *Attorney, Agent, or Firm* — Thomas, Kayden, Horstemeyer & Risley, LLP

(57) ABSTRACT

A method and system for distributing electronic messages, such as e-mails, using a subject-category-identifier are disclosed. A server receives electronic messages having an subject-category-identifier. The server includes logic for reading the subject-category-identifier and logic for sorting the electronic messages into a category based at least upon the subject-category-identifier. The server determines whether the electronic message is a valid electronic message for distribution; and responsive to determining that the electronic message is valid, the server distributes the electronic message according to the subject-category-identifier.

18 Claims, 5 Drawing Sheets

U.S. PATENT DOCUMENTS

| | | | |
|---|---|---|---|
| 2003/0088824 A1* | 5/2003 | Ayan | 715/500 |
| 2004/0117451 A1* | 6/2004 | Chung | 709/207 |
| 2005/0015455 A1* | 1/2005 | Liu | 709/207 |
| 2005/0198125 A1* | 9/2005 | Macleod Beck et al. | 709/204 |
| 2005/0204002 A1* | 9/2005 | Friend | 709/206 |
| 2006/0031311 A1* | 2/2006 | Whitney et al. | 709/206 |
| 2006/0242037 A1* | 10/2006 | Tanimura et al. | 705/35 |
| 2008/0288601 A1* | 11/2008 | Keohane et al. | 709/206 |

OTHER PUBLICATIONS

Denny; Non-Final Rejection mailed Aug. 7, 2008 for U.S. Appl. No. 11/283,458, filed Nov. 18, 2005.

* cited by examiner

ELECTRONIC MESSAGE DISTRIBUTION SYSTEM

TECHNICAL FIELD

The present disclosure is generally related to distributing electronic messages and, more particularly, is related to distributing bulk electronic message.

BACKGROUND

Today, many people have electronic mail accounts for communicating electronic messages, such as electronic mail messages (e-mails), with friends and workers. These e-mail accounts are frequently overrun with unwanted and/or unsolicited e-mail or spam e-mail from bulk e-mailers. Just as conventional bulk mailers provide unwanted and/or unsolicited mail to a person's physical roadside mail box, bulk e-mailers send millions of unsolicited e-mails. Many people complain of having to spend too much time deleting unwanted and/or unsolicited e-mails from their e-mail accounts just to access the e-mails that they do want to receive.

In addition, these unsolicited e-mails can cause system slow down. Sometimes, a bulk e-mailer will blindly send hundreds or thousands or more e-mails to intended recipients, and some or many of the e-mail addresses will be wrong. To combat spam e-mail, many people are employing "spam filters," which are meant to screen received e-mail and stop the delivery of unwanted/and unsolicited e-mails and/or sort the received e-mail into various categories. However, a problem with spam filters is that bulk e-mailers are constantly trying to defeat them by changing the modus operandi, and spam filters are hard to configure so that they never drop wanted mail and/or incorrectly sort wanted mail.

Thus, a heretofore unaddressed need exists in the industry to address the aforementioned deficiencies and inadequacies.

SUMMARY

Embodiments, among others, of the present disclosure provide for distributing electronic messages, such as e-mail. Briefly described, in architecture, one embodiment of a system, among others, can be implemented as follows. A server is adapted to receive electronic messages having a subject-category-identifier. The server includes logic for reading the subject-category-identifier and logic for sorting the electronic message into a category based at least upon the subject-category-identifier.

Embodiments, among others, of the present disclosure can also be viewed as providing methods for distributing e-mail. In this regard, one embodiment of such a method, among others, can be broadly summarized by the following steps: receiving an electronic message having a subject-category-identifier; determining whether the electronic message is a valid electronic message for distribution; and responsive to determining that the electronic message is valid, distributing the electronic message according to the subject-category-identifier.

Other systems, methods, features, and advantages of the present disclosure will be or become apparent to one with skill in the art upon examination of the following drawings and detailed description. It is intended that all such additional systems, methods, features, and advantages be included within this description and be within the scope of the present disclosure.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Any process descriptions or blocks in flow charts should be understood as representing modules, segments, or portions of code which include one or more executable instructions for implementing specific logical functions or steps in the process, and alternate implementations are included within the scope of the present disclosure in which functions may be executed out of order from that shown or discussed, including substantially concurrently or in reverse order, depending on the functionality involved, as would be understood by those reasonably skilled in the art of the present invention.

Figure 1:
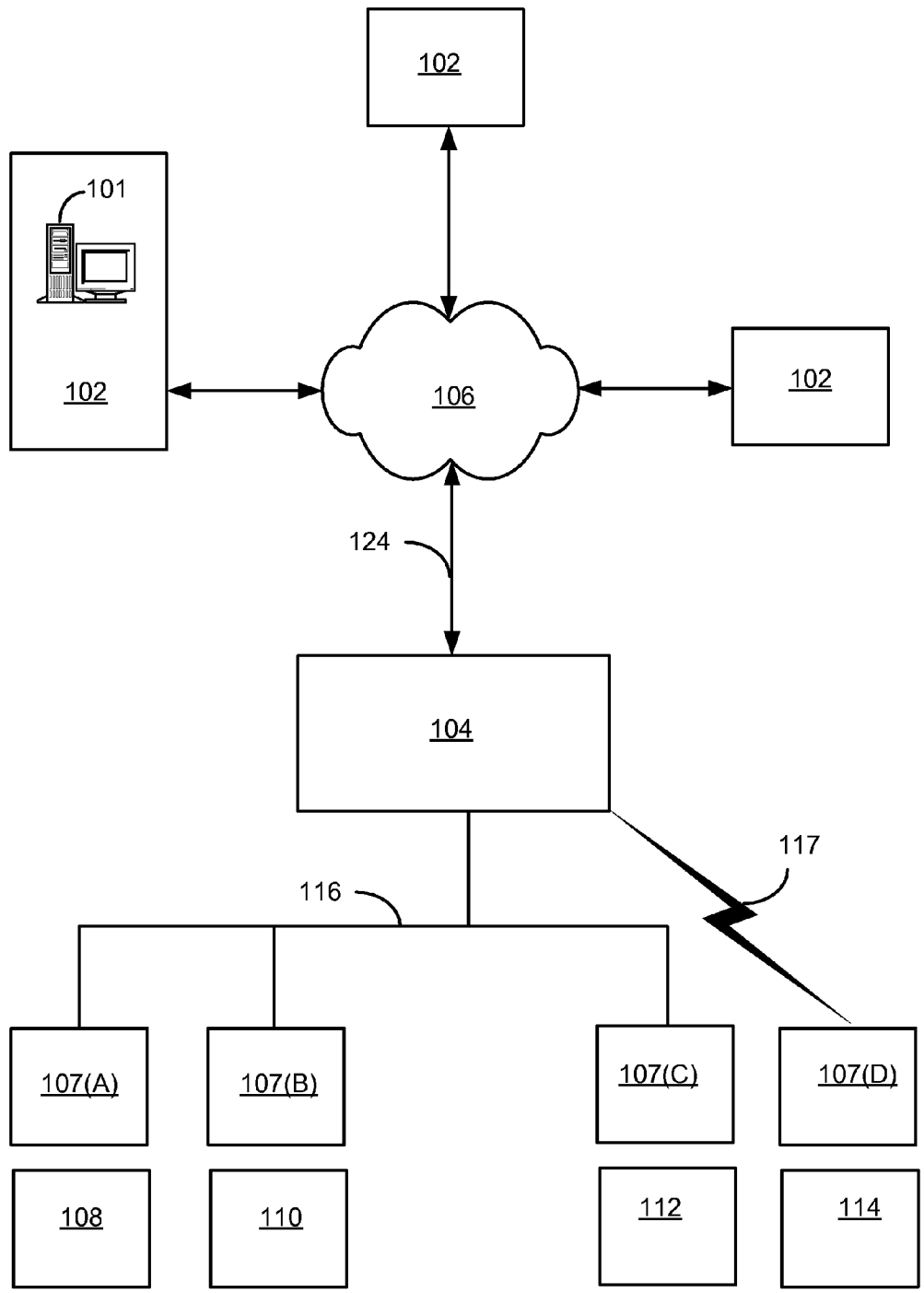
FIG. 1 is a block diagram of an exemplary electronic messaging system.

FIG. 1 is a block diagram illustrating a plurality of bulk e-mailers 102 and an e-mail distribution system 104, which are coupled via a network such as the Internet 106. It is to be understood that the Internet 106 is merely one type of network that can provide communication path(s) between the e-mail distribution system 104 and the bulk e-mailers 102.

The bulk e-mailers 102 include organizations/businesses and others who send mass e-mails. Exemplary bulk e-mailers include, but are not limited to, billing entities that bill people/businesses/organizations/etc. for, among other things, goods and/or services rendered and advertising entities that provide advertisement and promotional material.

The bulk e-mailers 102 have hardware such as, but not limited to, computers (not shown), servers including an e-mail server 101, clients (not shown), etc., personnel, and software for providing e-mail to the e-mail distribution system 104.

In one embodiment, the e-mail distribution system 104 includes, among other things, the hardware and software to receive, transmit, and distribute e-mails, and the personnel such as an operator (not shown). An operator of the e-mail distributor establishes a set of system rules, examples of which are described in detail hereinbelow, for, among other things, receiving, and distributing e-mails and handling subscriptions of e-mails. Among other things, the e-mail distribution system 104 receives e-mails and distributes e-mails to e-mail accounts of subscribers 108-114 of the e-mail distribution system 104. It should be appreciated, of course, that multiple users may use the same e-mail account under a single subscription. Thus, the term "subscriber" includes people, businesses, organizations, etc. who receive the services of the e-mail distribution system 104. Each subscriber has at least one device 107(A) -107(D) that is capable of receiving and transmitting e-mails. Exemplary e-mail capable devices include, but are not limited to, computers including main frame, desktop, laptop, servers, etc., cell phones, and personal digital assistants (PDAs), etc. The e-mail-capable devices 107(A) and 107(C) interface with the e-mail distribution system 104 over a communication link 116. The e-mail capable device 107(D) interfaces with the e-mail distribution system 104 over a wireless communication link 117.

In some embodiments, the e-mail distribution system 104 is embodied in an internal e-mail server such as, but not limited to, in a private or company network environment. In yet another embodiment, the e-mail distribution system 104 is embodied in a public/subscription e-mail server such as, but not limited to, in an Internet Service Provider (ISP) environment and/or "web" based e-mail account environment.

The e-mail distribution system 104 receives conventional e-mails from various sources including the bulk e-mailers 102 and receives from bulk e-mailers 102 user-specific and user-generic e-mails. For the purposes of this disclosure, user-specific and user-generic e-mails each include an e-mail subject-category-identifier, and conventional e-mails do not include a subject-category-identifier (SCI). In addition, a user-generic e-mail is an e-mail for which there is no specific recipient subscriber 108-114, and a user-specific e-mail is an e-mail for which there is at least one specific recipient subscriber. Subject-category-identifiers are described in detail hereinbelow.

E-Mail Distribution System

Figure 2:
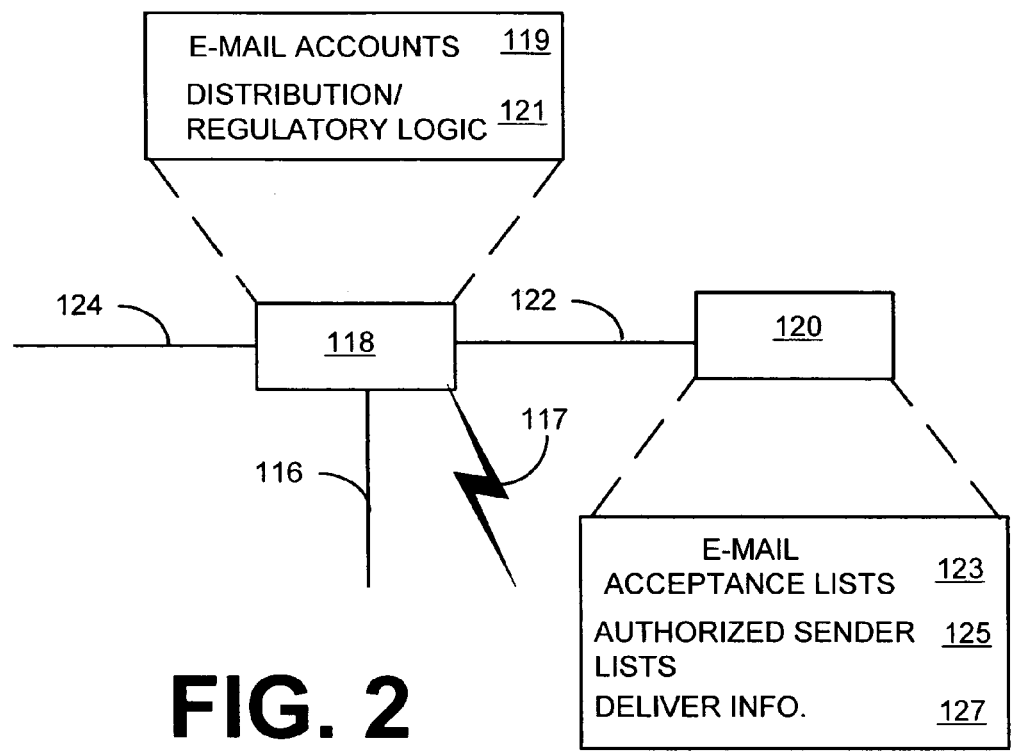
FIG. 2 is a block diagram of selected components of an exemplary electronic messaging distribution system.

FIG. 2 is a block diagram of selected components of the e-mail distribution system 104. With reference to FIGS. 1 and 2, the e-mail distribution system 104 includes, among other things, a server 118, and a database 120. The server 118 is in communication with the database 120 via a communication link 122 and with the subscribers 108-114 via the communication link 116. The server 118 is also coupled to the Internet 106 via communication link 124.

In one embodiment, the server 118 is a web-based e-mail server that includes subscriber e-mail account logic 119 and e-mail distribution/regulatory logic 121. As will be explained in detail hereinbelow, the e-mail distribution/regulatory logic 121 includes logic for, among other things, registering bulk e-mailers 102, filtering e-mails, parsing fields of e-mails, sorting e-mails, establishing e-mail accounts including folders for the e-mail accounts, distributing e-mails, and monitoring/accumulating delivery information. In one embodiment, the server 118 includes e-mail account logic 119, and a subscriber can access his or her e-mail using a web browser (166) or an e-mail client 162 (See FIG. 6).

Embodiments can be implemented in hardware, software, firmware, or a combination thereof. In some embodiments, the e-mail distribution/regulatory logic is implemented in software or firmware that is stored in a memory and that is executed by a suitable instruction execution system. If implemented in hardware, as in an alternative embodiment, the e-mail distribution/regulatory logic can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Among other things, the operator of the e-mail distribution system establishes a naming/addressing convention for e-mail. The distribution/regulatory logic 121 includes logic for distributing and sorting e-mail according to the naming/addressing convention established by the operator.

Among other things, the operator of the e-mail distribution system registers bulk e-mailers 102. Typically, a bulk e-mailer 102 provides the operator with registration information, and the operator uses an administrative interface or other input device to add the bulk e-mailer 102 to an authorized sender list 125, which is stored in the database 120. The registration information can be received orally, or in a written communication, or electronically, or from a trusted third party. As part of the registration process, the bulk e-mailer 102 provides the e-mail distribution system 104 with its IP address, and the IP address is included in the authorized sender list 125. In addition, the operator informs the registered bulk e-mailer 102 about the naming/addressing convention that the operator has established so that the bulk e-mailer 102 can send e-mails in the appropriate format.

Among other things, the operator of the e-mail distribution establishes categories of e-mails. The categories of e-mails are determined by the operator who, in some embodiments, uses an administration panel or other input device to add categories to a table used in sorting received e-mails. The categories for the e-mails are used for, among other things, providing an efficient way to sort and screen received e-mails. In addition, as will be explained in detail hereinbelow, the categories are also used in the folder structure of a subscriber's e-mail account. In one embodiment, distributing the electronic message includes creating a link to the electronic message and providing the link to a subscriber of the electronic message distribution system, wherein the link is provided in a designated folder that is associated with an electronic message subject-category-identifier. In one embodiment, e-mail categories include, but are not limited to, bills, promotions and subscriptions. E-mails containing a "bill" are categorized as "Bills"; e-mails containing promotions are categorized as "promotions", etc.

Normally, the subscription category can be further categorized by subscriber interest. For example, other non-limiting categories include "golf", "financial news", "technology", "science", "recreation", etc. As will be explained in detail hereinbelow, user-specific and user-generic e-mails include an e-mail subject-category-identifier that corresponds to at least one of the e-mail categories established by the operator of the e-mail distribution system 104. The server 118 uses the e-mail subject-category-identifier in an e-mail to determine, among other things, the category of the e-mail.

The database 120 includes e-mail acceptance lists 123, authorized sender list 125, and delivery information 127. In one embodiment, subscribers 108 through 114 can selectively accept delivery of categories of e-mail and their selections are noted in the e-mail acceptance list 123. An exemplary method for accepting delivery of categories of e-mail is described hereinbelow.

E-mails include the IP address of the server from which they were sent, and the e-mail distribution system 104 sorts through received e-mails to cull out e-mails that do not come from registered senders. If an e-mail is a "user-specific" or "user-generic" e-mail and is from an unregistered IP address, then the e-mail is dropped. If an e-mail is a conventional e-mail, i.e., one that does not include an e-mail subject-category-identifier, then it does not matter whether or not the e-mail came from a registered sender because only e-mails that have an e-mail subject-category-identifier need come from a registered sender. Conventional e-mails are processed according to conventional methods (including passing them through spam filters known to those skilled in the art) without concern as to whether or not the sender is registered.

The server 118 records information related to delivery of e-mails in database 120. In one embodiment, the delivery information 127 is on a per subscriber basis and/or on a per e-mail basis. In another embodiment, the delivery information 127 is on a per category basis. Generally, delivery information on a per subscriber/per e-mail basis includes at least one of the following: the date that the e-mail was delivered; the date the e-mail was downloaded, if applicable; and the date the e-mail was opened. Delivery information on a per category basis is generally statistical in nature such as the percentage of e-mails in a given category that are accessed/downloaded/opened. As described hereinbelow, in one embodiment, the delivery information is determined by the server 118, and in another embodiment, the delivery information is reported to the server 118 by an e-mail client 162. (See FIG. 6.)

Figure 3:
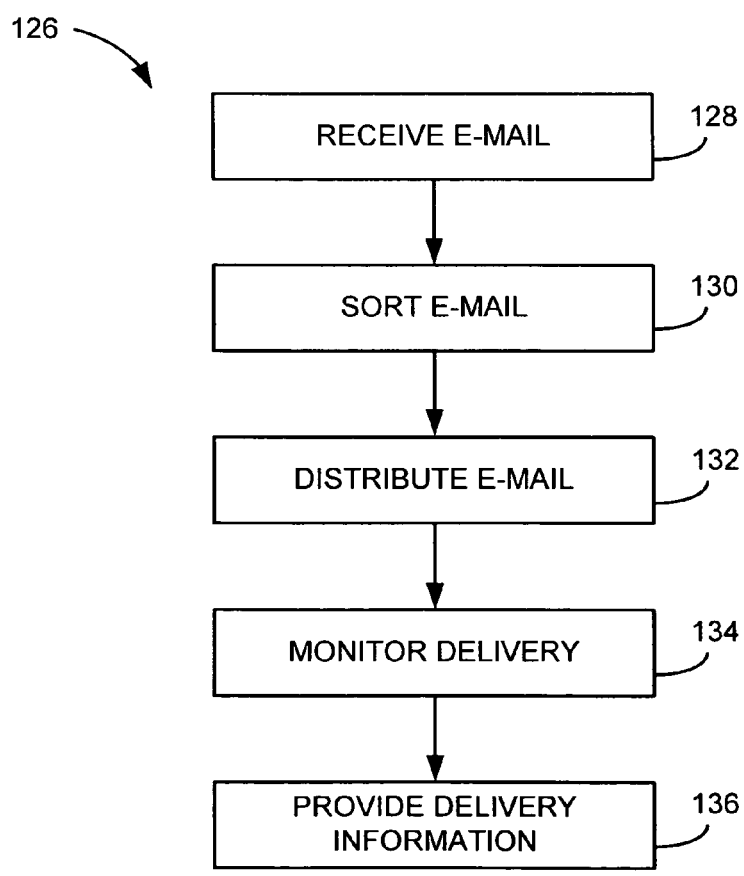
FIG. 3 is a flow chart of exemplary steps implemented by the e-mail distribution system.

FIG. 3 is a flow chart that illustrates exemplary steps 126, which are implemented by the server 118. In step 128, the server 118 receives e-mails. The types of e-mails received by the server 118 include conventional e-mail, user-specific e-mail, and user-generic e-mail. In step 130, the server 118 sorts the received e-mails into at least three classifications: the classifications include conventional; user-specific; and user-generic. The server 118 sorts the received e-mails based at least upon the presence or lack of an e-mail subject-category-identifier. Conventional e-mails are sorted from the user-specific and user-generic e-mails, and, in one embodiment, the e-mail distribution system 104 then employs filtering techniques known to those skilled in the art to recognize "conventional" bulk e-mail, i.e., spam, and block or partially block the "conventional" bulk e-mail. The server 118 also determines whether "user-specific" and "user-generic" e-mails came from an authorized/registered bulk e-mailer 102. The database 120 includes, among other things, a list of authorized/registered bulk e-mailers 102 and/or a list of addresses of authorized/registered bulk e-mailers 102. "User-specific" and "user-generic" e-mails that do not come from authorized/registered bulk e-mailers 102 are dropped by the server 118.

In step 132, the server 118 distributes the "user-specific" and "user-generic" e-mails from authorized/registered bulk e-mailers 102. The server 118 distributes the "user-generic" e-mails to subscribers using the bulk-e-mail acceptances lists 123. In some embodiments, among others, the server 118 uses the bulk-e-mail acceptances lists 123 to send subscribers notices or receipts when a user-generic e-mail from a bulk e-mailer 102 has arrived, thereby putting the subscriber on notice so that the subscribers may then access the user-generic e-mail, as described hereinbelow.

In one embodiment, the e-mail distribution system 104 has agreements with the bulk e-mailers 102 regarding the distribution of received e-mails. For example, the bulk e-mailers 102 may have agreed to pay the e-mail distribution system for distributing e-mails. The e-mail distribution system 104 may charge the bulk e-mailers 102 different amounts depending on how the bulk e-mailers 102 want their e-mails distributed. One of the bulk e-mailers 102 may want to pay less by having its e-mail distributed during off-peak hours, then, in that case, the server 101 of that bulk e-mailer will hold onto the e-mails and forward the e-mails to the server 118 at the appropriate time. Alternatively, e-mails may be distributed at any time, but, in that case, the e-mail distribution system 104 may charge a premium amount. In some embodiments, the bulk e-mailer 102 and the e-mail distribution system 104 have an agreement that the e-mail distribution system 104 will only distribute e-mails from the bulk e-mailer 102 at non-premium times. In which case, the server 118 will block any e-mails from the bulk e-mailer 102 that come during non-premium times.

In some embodiments, the e-mail distribution system 104 charges the bulk e-mailer 102 according to the size of the e-mails from the bulk e-mailer 102. In this embodiment, the distribution/regulatory logic 121 includes the logic to determine the size of received e-mail and bill the appropriate sender of the email. Thus, the bulk e-mailer 102 has an incentive to make the bulk e-mails as small as possible. To send a small e-mail, the bulk e-mailer 102 may send the equivalent of a "postcard" e-mail to the e-mail distribution system 104. Typically, the content of a "postcard" e-mail will have one or more links to webpages so as to reduce the size of the e-mail. Postcard e-mails are generally used for user-generic e-mails, but they can also be used for user-specific e-mails.

If an e-mail is a user-generic e-mail, then the server uses the e-mail acceptance lists 123 and the e-mail subject-category-identifier of the user-generic e-mail to determine which subscribers have selected to receive such user-generic e-mails. Then the server 128 sends a copy of the e-mail to those subscribers, i.e., those subscribers who have elected to receive user-generic e-mails in a given e-mail category.

In step 134, among other things, the server 118 monitors delivery of the user-specific and user-generic e-mails. In some embodiments, the e-mail accounts of the subscribers are web-based accounts implemented using protocols such as, but not limited to, Internet Mail Access Protocol (IMAP), and in that case, the subscriber may access their e-mail account using web browsers known to those skilled in the art. The server 118 monitors web based access to determine, among other things, whether a subscriber opens an e-mail.

The e-mail accounts of some of the subscribers 108-114 are implemented using protocols such as, but not limited to, Post Office Protocol (POP). In that case, the subscribers having POP accounts may access their e-mail accounts using an e-mail client 162. (See FIG. 6.) In some embodiments, among others, the e-mail distribution system 104 provides at a portion of the e-mail client 162 to the subscribers 108-114, and the e-mail client 162 is adapted to provide delivery information to the server 118. The delivery information provided to the server 118, includes, but is not limited to, which e-mails are downloaded, and when e-mails are opened. The server 118 tabulates and records delivery information in the database 120.

In step 136, the e-mail distribution system 104 provides the bulk e-mailer 102, or others, with delivery information. The delivery information is a valuable property. Today, bulk e-mailers 102 do not often know how many people receive their e-mails or how many of the e-mails are actually opened. However in some embodiments, here the e-mail distribution system 104 has that information and may provide that information to others, normally for a fee.

In one embodiment, the e-mail distribution system 104 determines delivery information on a per subscriber basis. Among other things, this enables the e-mail distribution system 104 to confirm or deny whether or not a specific subscriber received a specific e-mail from an authorized/registered bulk e-mailer 102, and whether or not the specific e-mail was opened. Thus, in one embodiment, the e-mail distribution system 104 may act as an unbiased witness for resolving disputes, such as whether an e-mail account received a bill and whether the bill was opened.

E-Mail Categories and Naming Convention

As previously stated herein above, the operator of the e-mail distribution system 104 establishes e-mail categories such as, but not limited to, bills, subscriptions, sports, promotions, golf, etc. and naming/addressing information. The e-mail distribution system 104 provides the bulk e-mailer 102 with a list of e-mail categories. The bulk e-mailer 102 presorts outgoing e-mail according to the categories establishes by the e-mail distribution system 104. The bulk e-mailer 102 addresses its outgoing e-mail employing the categories established by the e-mail distribution system 104.

A conventional e-mail includes a recipient field that denotes the "user" and "address" of the recipient. The "address", which is also known as a "domain name" by those skilled in the art, is a string of alphanumeric characters that represent an Internet Protocol (IP) address, which is a 32 bit number. The "user" is a alphanumeric string that is separated from the "domain name" by a special character, the "@". The character "." (dot) is also a special character when used in the "domain name" because the "." (dot) denotes breaks between "levels". The "domain name" is comprised of multiple hierarchical levels with the highest level on the right hand side and each level is separated by a "." (dot). Domain Name Servers (DNS) read the "domain name" from right to left to determine the IP address associated with the "domain name". Typically, the "domain name" includes two levels, but it can include more than two levels. <USER>@<SECOND LEVEL DOMAIN>.<TOP LEVEL DOMAIN> is an exemplary recipient field for "<USER>" at the address having the "domain name" "<SECOND LEVEL DOMAIN>.<TOP LEVEL DOMAIN>", and "BELLSOUTH.NET" is an example of a "domain name" having two levels. A three level "domain name" is given by "<THIRD LEVEL DOMAIN>.<SECOND LEVEL DOMAIN>.<TOP LEVEL DOMAIN>", and "STUDENT.GSU.EDU" is an example of a three level "domain name". Generally, only the top two levels in the "domain name" are used to route an e-mail from a sender to the intended recipient ("user"). However, when the "domain name" includes a third level domain and/or lower level domains, then the top two levels are used by a DNS to route the e-mail to a specific server, and then the server uses the third domain level and/or lower domain levels to route the e-mail within a "subsystem." Those skilled in the art are familiar with Domain Name Servers, domain names, domain levels, and routing of conventional e-mail, and consequently, the routing/processing of conventional e-mails will not be discussed. Hereinafter, "Domain_Name" represents the alphanumeric address, eg., "<SECOND LEVEL DOMAIN>.<TOP LEVEL DOMAIN>", "<THIRD LEVEL DOMAIN>.<SECOND LEVEL DOMAIN>.<TOP LEVEL DOMAIN>", etc., as opposed to the IP address, for a conventional e-mail.

User-Specific and User-Generic E-Mails

In some embodiments, a user-generic e-mail, which is described in detail hereinbelow, is addressed as "SCI_1@<SECOND LEVEL DOMAIN>.<TOP LEVEL DOMAIN>" where "SCI_1" is a subject-category-identifier that is associated with at least one of the categories established by the operator of the e-mail distribution system 104, and where "<SECOND LEVEL DOMAIN>.<TOP LEVEL DOMAIN>" is a "domain name," which is well known to those skilled in the art. A user-specific e-mail, which is also described in detail hereinbelow, for a given subscriber is addressed as "username@SCI_2.<SECOND LEVEL DOMAIN>.<TOP LEVEL DOMAIN>," where "username" is the given subcriber's e-mail account name, and "SCI_2" is a subject-category-identifier that is associated with at least one of the categories established by the operator of the e-mail distribution system 104. As will be explained hereinbelow, in one embodiment, the subject-category-identifier of a user-specific e-mail can be equivalent to the subject-category-identifier of a user-generic email, but the e-mail distribution 104 will process user-specific emails differently from user-generic e-mail.

It should be noted that, according to one embodiment, the bulk e-mailer 102 will send the e-mail distribution system 104 a single user-generic e-mail. The e-mail distribution system 104 will then send a copy to selected subscribers of the e-mail distribution system 104. In some situations, the bulk e-mailer 102 will send a single user-specific e-mail to the e-mail distribution system, and the single e-mail will include addresses of intended recipients, which the e-mail distribution system then uses to send copies of the e-mail to the intended recipients. The e-mail distribution system may then provide the bulk e-mailer 102 with an updated list of recipients if one or more of the e-mail accounts of the intended recipients has changed status. The bulk e-mailer 102 may also send a user-specific e-mail that is intended for only one subscriber.

Figure 4A:
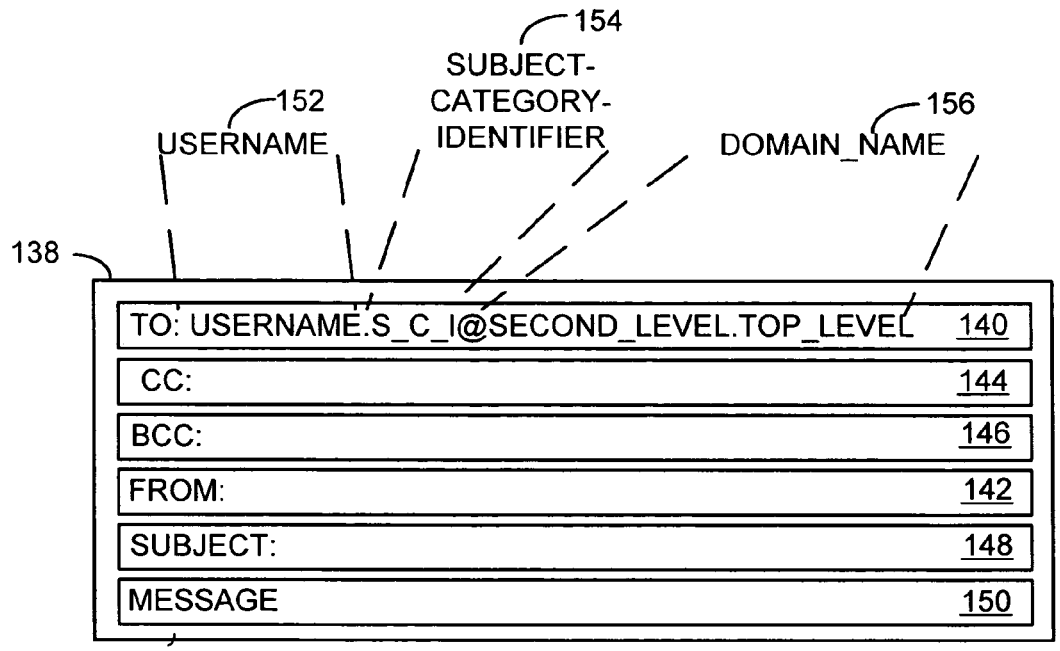
FIG. 4A is a block diagram of an exemplary generic e-mail.
Figure 4B:
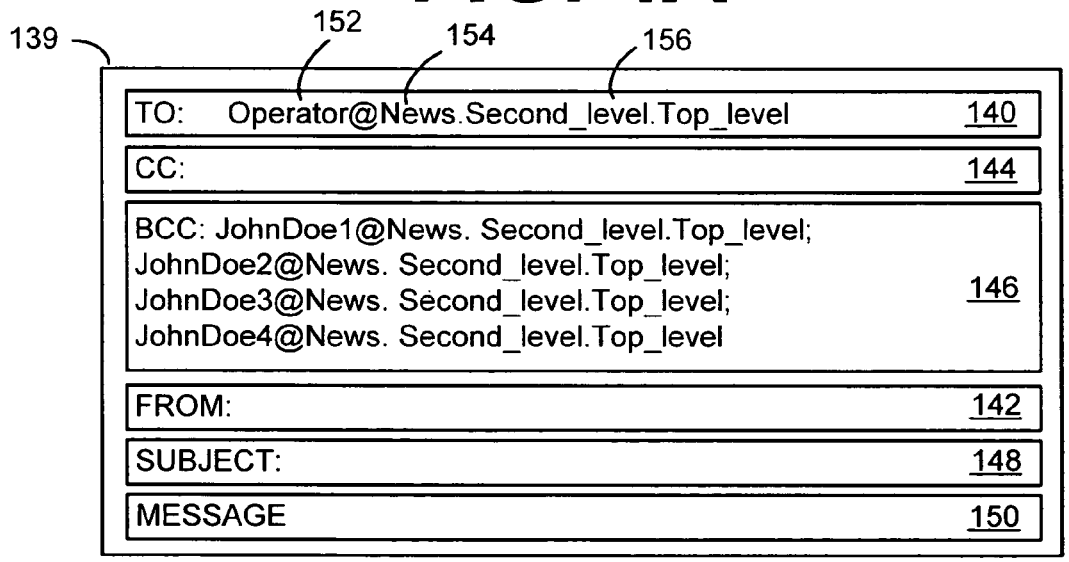
FIG. 4B is a block diagram of an exemplary user-specific e-mail.
Figure 4C:
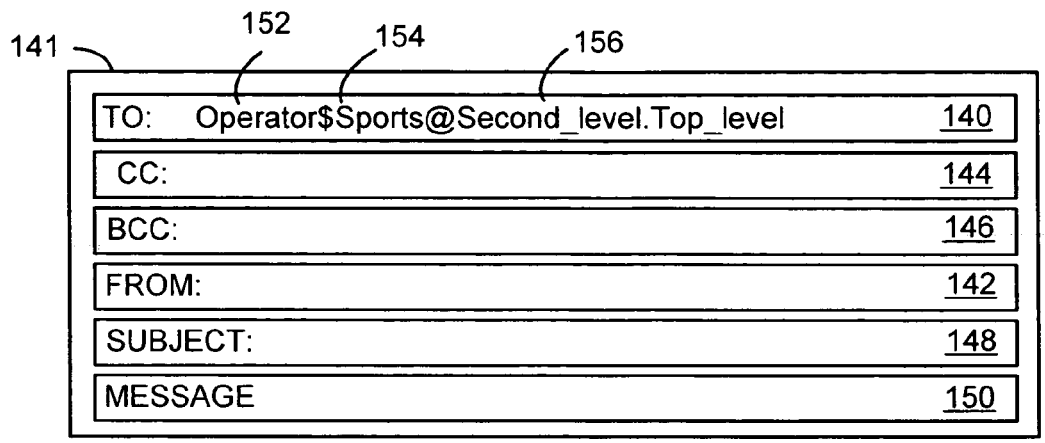
FIG. 4C is a block diagram of an exemplary user-generic e-mail.

FIGS. 4A and 4B illustrate a first embodiment of a user-specific e-mail 138 and a second embodiment of a user-specific e-mail 139, and FIG. 4C illustrates an embodiment of a user-generic e-mail 141. Referring to FIG. 4A, an exemplary user-specific e-mail 138 includes a recipient field 140, a sender field 142, a carbon copy (cc) field 144, a blind carbon copy (bcc) field 146, a subject field 148, and a message field 150. The subject field 148 and message field 150 are conventional fields that will not be discussed.

The recipient field 140 of the e-mail 138 can be thought of as having three (3) distinct portions: a) User_Name 152; b) e-mail subject-category-identifier (SCI) 154; and c) Domain_Name 156. Domain name servers use the Domain_Name 156 to determine the IP address of the e-mail server associated with the Domain_Name, and the User_Name 152 is used by the receiving e-mail server to route the e-mail 138 to the intended recipient.

The e-mail subject-category-identifier 154 identifies the e-mail 138 as having certain content or characteristics. The server 118 of the e-mail distribution system 104 uses the e-mail subject-category-identifier 154 to, among other things, sort received e-mails. In this first embodiment, the SCI 154 is on the left hand side of the "@", which means that servers outside of the e-mail distribution system 104 do not utilize the SCI 154. The User_Name 152 and SCI 154 are separated by a "." but they can be separated by any character such as "$" or any other character designated by the operator of the e-mail distribution system. In the second embodiment illustrated in FIG. 4B, the SCI 154 is on the right hand side of the "@", which means that servers outside of the e-mail distribution system 104 will see the SCI 154 as a lower level domain. However, the servers outside of the e-mail distribution system 104 do not use the SCI 154 to route the user-specific e-mail 139 because only the top two levels are used by Domain Name Servers.

It should be noted that the cc field 144 and bcc field 146 are also used for the addresses of recipients. Consequently, the server 118 also reads the cc field 144 and bcc field 146 to determine, among other things, User_Names 152 and e-mail subject-category-identifiers 154.

The e-mail 138 includes an indicator of the sender of the e-mail such as the name/address carried in the sender field 142 and the IP address of the server that sent the e-mail. Using information related to the sender and the authorized sender lists 125, the server 118 determines whether the e-mail 138 came from an authorized sender. If the e-mail 138 did not come from an authorized sender, then it is dropped. It should be remembered that the server 118 determines whether the sender of an e-mail is an authorized sender only, in some embodiments, if the e-mail includes an e-mail subject-category-identifier 154.

The server 118 of the e-mail distribution system 104 sorts received e-mails using the e-mail subject-category-identifier portion 154. Generally, subscribers 108-114 of the e-mail distribution system 104 are free to choose their own user names, but if the User_Name 152 and e-mail subject-category-identifier 154 are both to the left-hand side of the "@", then the subscribers are generally not permitted to have user names that correspond to an e-mail category established by the operator of the e-mail distribution system 104. For example, a subscriber would generally not be permitted to have the User_Name "sports".

It should be noted that the SCI 154 may be in any portion of the recipient field 140 (and corresponding portions of the cc field 144 and bcc field 146) and/or in the subject field 148 or any other portion of the e-mail 138. So long as the sender of the e-mail puts the e-mail subject-category-identifier 154 in the location specified by the operator of the e-mail distribution system 104, then the sever 118 will be able to use the e-mail subject-category-identifier to, among other things, sort e-mail.

User-Specific E-Mail

Assume for the moment that subscribers 108-114 each have e-mail accounts with a user name of "JohnDoe1"-"JohnDoe4", respectively, and that they have each subscribed to a news service. In one embodiment, as illustrated in FIG. 4B, the bulk e-mailer 102 sends a single e-mail 139 to the e-mail distribution system. In this exemplary e-mail, the SCI 154 is denoted by "News". The recipient field 140 of the single e-mail includes "Operator@News.Second_level.Top_level" and the bcc field 146 includes the following:
JohnDoe1@News.Second_level.Top_level;
JohnDoe2@News.Second_level.Top_level;
JohnDoe3@News.Second_level.Top_level;
JohnDoe4@News.Second_level.Top_level; and
JohnDoe5@News.Second_level.Top_level. When the server 118 receives the e-mail 139, the server 118 parses the addresses in the bcc field 146 to determine the SCI 154 (News) and the user names of the recipients. If the e-mail account for "JohnDoe5" has changed state such that it is inoperative, then, in one embodiment, the operator of the e-mail distribution system 104 provides the bulk e-mailer 102 with an indication of which of the intended recipients are still valid or which are invalid, etc. In one embodiment, the server 118 distributes the e-mail 139 immediately, and yet, in another embodiment, the server 118 defers distribution depending upon the agreement with the sender. As will be described hereinbelow, the subject-category-identifier 154 is used to sort the e-mail 139 so as to provide the recipients with a convenient way to access it. The User_Name 152 (Operator) in the recipient field 140 can be anything. It merely serves as a record of the transaction to a common administrative mailbox for review and accounting purposes. In some embodiments, the User_Name 152 can be used to designate an action. For example, if the User_Name is "priority," then the e-mail 139 is distributed on a priority basis, but if the User_Name is "bulk," then the e-mail is distributed when the e-mail distribution system 104 has the time/bandwidth to do it.

User-Generic E-Mail

Assume for the moment that subscribers 108-114 each have e-mail accounts with a user name of "JohnDoe1"-"JohnDoe4", respectively, and that they have each selected to receive user-generic e-mails belong to e-mail category "sports". In one embodiment, as illustrated in FIG. 4C, the bulk e-mailer 102 sends a single user-generic e-mail 141 to the e-mail distribution system 104. The recipient field 140 of the single e-mail includes "Operator$Sports@Second_level.Top_level" and the cc field 144 and the bcc field 146 are empty. When the server 108 receives the e-mail 141, the server 118 parses the recipient field 140. In this exemplary e-mail, the "$" is a special character that designates a break between the User_Name (Operator) 152 and the SCI (Sports) 154. The server 118 checks the "sports" e-mail acceptance list 123 and determines which of the subscribers 108-114 have elected to receive user-generic e-mails in the sports category. In one embodiment, the server 118 might distributes the e-mail 139 immediately, but in another embodiment, the server 118 defers distribution depending upon the agreement with the sender. As will be described hereinbelow, the e-mail subject-category-identifier 154 is used to sort the e-mail 139 so as to provide the recipients with a convenient way to access it. Again, the user name (Operator) in the recipient field 140 can be anything. It merely serves as a main mailbox or alias from which to reference the distribution to the appropriate folder of those subscribers in the e-mail acceptance list 123. In addition, in one embodiment, the User_Name 152 and the SCI 154 are the same. In that case, the operator of the e-mail distribution system 104 would prevent subscribers of the e-mail distribution system from having User_Names that are the same as the SCI.

E-Mail Folder Structure

Figure 5:
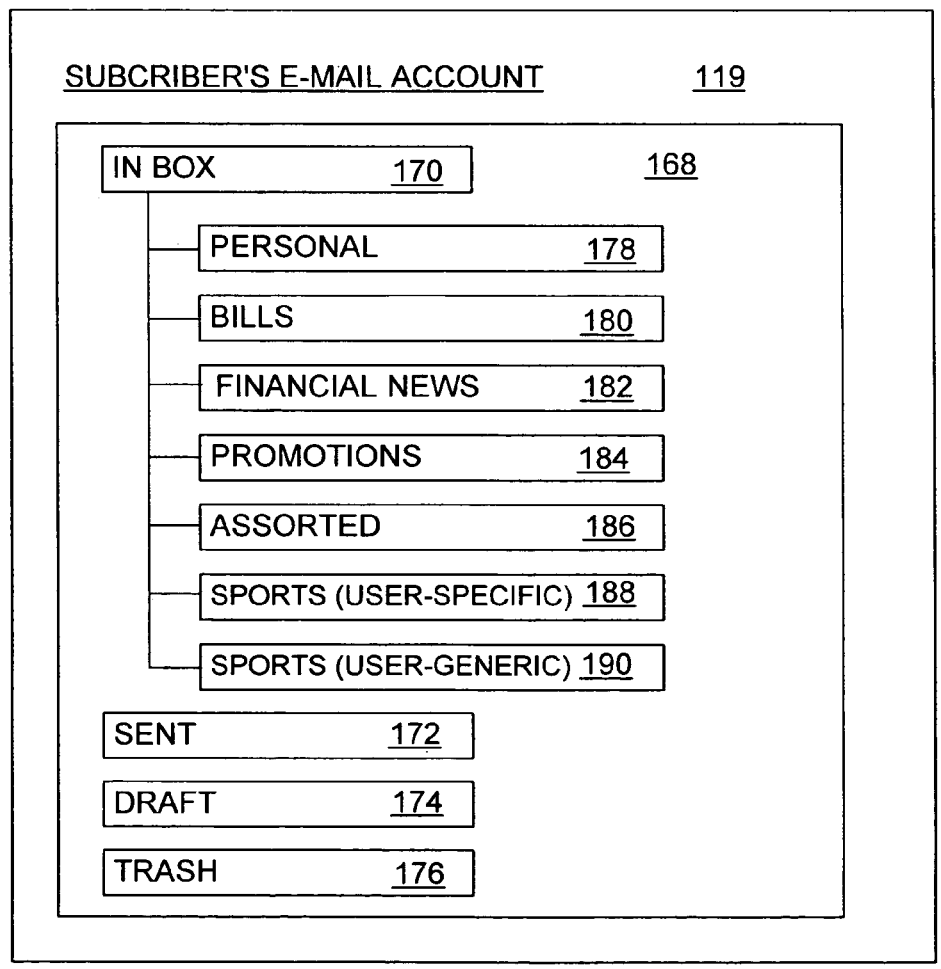
FIG. 5 is a block diagram of an exemplary folder structure in an e-mail account.

Illustrated in FIG. 5 is an exemplary folder structure 168 for a subscriber's e-mail account such as subscriber 110. The folder structure includes an inbox folder 170, a sent folder 172, a draft folder 174 and a trash folder 176. The sent folder 172, draft folder 174, and trash folder 176 are conventional folders known to those skilled in the art and shall not be discussed. Inbox 170 includes a plurality of subfolders such as, but not limited to, personal 178, bills 180, financial news 182, promotions 184, assorted 186, sports (user-specific) 188, and sports (user-generic) 190. In one embodiment, the server 118 provides web based e-mail accounts, and the folder structure illustrated in FIG. 5 is implemented in the server 118. In another embodiment, an e-mail client 162 (See FIG. 6) receives e-mails from the server 118, and the e-mail client 162 implements the folder structure illustrated in FIG. 5.

The personal folder 178 is where conventional e-mail is deposited, where a conventional e-mail is addressed to the recipient using the standard format "username@Second_level.Top_level." It should be remembered that the server 118 would typically apply a Spam filter to conventional e-mails. The goal of Spam filtering conventional e-mails is to reduce Spam such that the personal folder 178 contains mostly or entirely individualized e-mails for the recipient. The bills folder 180, news folder 182, financial news folder 184, promotions folder 186 and assorted folder 188 are for receiving sorted user-specific and user-generic e-mails. For example, all of the subscriber's electronic bills are sent to the subscriber using "bill" as their e-mail subject-category-identifier.

As illustrated by the "sports (user-specific)" folder 188 and the "sports (user-generic)" folder 190, the user may have separate folders for both user-specific and user-generic e-mails for any category of e-mail. Here, the subscriber 110 has signed up for receiving user-generic bulk e-mail belonging to the category "sports". His e-mail address appears in the "sports" e-mail acceptance list 123. Whenever, a user-generic bulk e-mail having "sports" as its e-mail subject-category-identifier is received at the server 118, the subscriber receives a copy of the e-mail. The copy is deposited into the "sports (user-generic)" folder 190. The "sports (user-specific)" folder 188 is used for receiving user-specific sports e-mails, i.e., e-mails that include the e-mail address of the subscriber and the "sports" subject-category-identifier.

It should be noted that the illustrated folder structure 168 is merely a non-limiting example. In an alternative embodiment, user-specific e-mails may be deposited into the personal folder 178, and the other sub-folders of the inbox 170 are used for receiving user-generic e-mails.

In some embodiments, when the server 118 receives a user-specific or a user-generic e-mail, the server 118 reads the e-mail subject-category-identifier 154 of the e-mail. The server 118 then uses the e-mail subject-category-identifier to determine which folder to deposit a copy of the e-mail. Thus, each of the folders 180-190 contains a category of e-mail, thereby providing the subscriber with an efficient way to manage his or her e-mail account. Personal/individualized e-mails are not lost among the clutter of Spam because they are deposited in a separate folder and the same for bills and other categories of e-mail.

Accessing E-Mail Account

Figure 6:
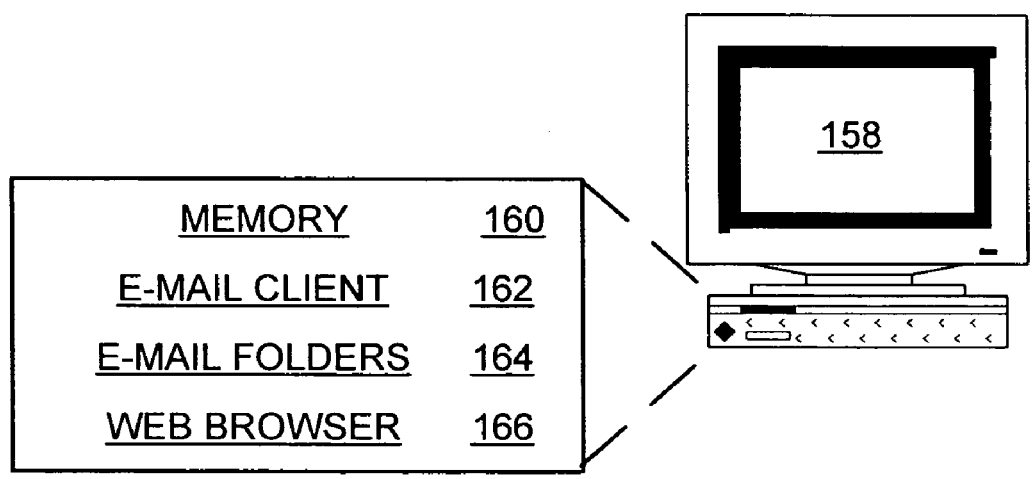
FIG. 6 is an illustration of a computer for accessing an e-mail distribution system.

FIG. 6 illustrates a computer system 158 that a subscriber, such as subscriber 108, may use to access the e-mail distribution system 104. The computer 158 has a memory 160 that includes an e-mail client 162, which the e-mail distribution system 104 has provided to the subscriber and a browser 163. The subscriber may use either the e-mail client 162 or the browser 163 to access his or her e-mail account data 119. The e-mail client 162 is adapted to receive e-mails from the server 118. The e-mail client 162 is also adapted to create e-mail folders, in the structure illustrated in FIG. 5, that correspond to e-mail categories established by the operator of the e-mail distribution system 104. When a subscriber uses the e-mail client 162 to access the server 118, the e-mail client 162 gets e-mails from the subscriber's e-mail account data 119. The e-mail client 162 then downloads the e-mails from the server 118 and deposits the downloaded e-mails into the appropriate e-mail folders 164. The e-mail folders 164 correspond to the folders that were previously described in FIG. 5. The e-mail client 162 is adapted to report to the server 118 which e-mails are downloaded and when the e-mails are opened.

In some embodiments, the e-mail accounts data 119 are web based e-mail accounts. In this embodiment, the subscriber uses the browser 163 to access his or her e-mail account. The server 118 monitors the e-mail accounts data 119 and determines, among other things, when e-mails are delivered and when they are opened.

In some embodiments, the operator of the e-mail distribution system 104 incentivizes subscribers to accept or subscribe to receiving user-generic e-mails. For example the operator of the e-mail distribution system 104 might offer reduced charges or free access to the e-mail distribution system 104 based at least upon the number of categories of user-generic e-mail that the subscriber has selected to receive.

Subscribing/Unsubscribing to User-Generic E-Mails

In some embodiments, the e-mail client 162 includes an e-mail acceptance menu for selecting categories of e-mail that the subscriber wishes to accept. When the subscriber selects a category of e-mail such as "sports", the e-mail client creates a "sports" folder in the subscriber's e-mail account on the computer system 158 and sends a notice to the server 118 that the subscriber has now accepted user-generic e-mails belonging to the selected category. The server 118 then updates the appropriate e-mail acceptance list 123, and creates the necessary sub-folders in the subscriber's e-mail account on the server 118.

In the future, the subscriber may decide to no longer receive user-generic e-mails. In that case, the subscriber uses the e-mail acceptance menu of the e-mail client to unsubscribe from one or more of the categories of e-mails that he or she is currently subscribed to. The e-mail client 162 then sends the server 118 a notice of unsubscription for the categories of e-mail from which the subscriber no longer wishes to receive user-generic mail. Alternatively, the e-mail client 152 could send an individual notice of unsubscription for each of the categories of e-mail from which the subscriber no longer wishes to receive user-generic mail. The server 118 then updates the e-mail acceptance lists 123 to remove the subscriber's e-mail address from the appropriate e-mail acceptance lists.

The subscriber may also use the web browser 163 to access his e-mail account on the server 118. Using the web browser 163, the subscriber may then subscribe or unsubscribe from categories of e-mail, and the server will then amend the e-mail acceptance lists 123 in the appropriate manner.

Subscribing/Unsubscribing to User-Specific E-Mails

As previously described, the operator of the e-mail distribution system 104 registers bulk e-mailers 102, or in an alternative, the bulk e-mailers 102 register with a trusted third party. In some embodiments, one of the rules established by the operator of the e-mail distribution system 104 is that the subscribers 108-114 are allowed the option of stopping user-specific e-mails.

In some embodiments, the subscriber sends an unsubscribe notice for an e-mail category to the bulk e-mailer 102. For example, the subscriber 110 may currently be receiving user-specific e-mails in the categories of "sports" and "news" and may decide to quit receiving "sports" e-mails now that the football season is over. The subscriber 110 will then send the bulk e-mailer 102 an unsubscribe e-mail for the "sports" category. If the subscriber 110 continues to receive "sports" e-mails from the bulk e-mailer 102, then the subscriber 110 may complain to the operator of the e-mail distribution system 104.

The operator of the e-mail distribution system 104 can decide on the appropriate course of action in response to a complaint from the subscriber 110. Basically, the operator of the e-mail distribution system 104 has the ability to discipline the offending bulk e-mailer 102 because the bulk e-mailer 102 is registered with the e-mail distribution system 104. Examples of discipline include, but are not limited to, fining the offending bulk e-mailer 102, fully/partially denying the offending bulk e-mailer 102 access to the e-mail distribution system.

It should be emphasized that the above-described embodiments of the present disclosure are merely possible examples of implementations, merely set forth for a clear understanding of the principles of the disclosure. Many variations and modifications may be made to the above-described embodiment(s) of the disclosure without departing substantially from the spirit and principles of the disclosure. For example, all the description above has been largely directed to handling of electronic mail messages, it should be appreciated that the invention is also applicable to other types of electronic messages, e.g., text messages and Instant Messaging. All such modifications and variations are intended to be included herein within the scope of this disclosure and the present disclosure and protected by the following claims.

Therefore, having thus described the disclosure, at least the following is claimed:

1. A method of distributing electronic message to subscribers of an electronic message distribution system, the method comprising:
   receiving an electronic message having an electronic message subject-category-identifier;
   determining whether the electronic message was sent from an authorized sender of mass electronic messages;
   responsive to a determination that the electronic message was sent from an unauthorized sender, dropping the electronic message from distribution;
   responsive to a determination that the electronic message was sent from an authorized sender, determining if the electronic message has a message type of user generic, user specific, or conventional;
   responsive to the determination of the electronic message type, distributing the electronic message according to the message type and the electronic message subject-category-identifier,
   wherein an electronic message having the message type of user generic is distributed to all subscribers that have selected to receive messages for the subject-category identified in a recipient list of the electronic message, wherein a recipient email address for the electronic message of the message type user generic is a three level domain name and a third domain level of the recipient email address designates an action to be executed by the electronic message distribution system in distributing the electronic message,
   compiling delivery information on distributed electronic messages, the delivery information including a first percentage of electronic messages in a given subject-category that are accessed, a second percentage of the electronic messages in the given subject-category that are downloaded, and a third percentage of the electronic messages in the given subject-category that are opened; and
   reporting the delivery information to the authorized sender of the mass electronic messages.

2. The method of claim 1, wherein the electronic message is an electronic mail (e-mail) message, the method further comprising:
   receiving a selection of a subject-category of e-mail messages a subscriber decides to accept; and
   automatically creating a sub-folder in the subscriber's e-mail account for storing the selected subject-category of e-mail messages.

3. The method of claim 1, wherein distributing the electronic message further includes:
   creating a link to the electronic message;
   providing the link to a subscriber of the electronic message distribution system,
      wherein the link is provided in a designated folder that is associated with the electronic message subject-category-identifier.

4. The method of claim 1, wherein distributing the electronic message further includes:
   creating a copy of the electronic message;
   providing the copy to a subscriber of the electronic message distribution system,
      wherein the copy is provided in a designated folder that is associated with the electronic message subject-category-identifier.

5. The method of claim 1, further including:
   monitoring subscriber access to the electronic message.

6. The method of claim 5, wherein monitoring subscriber access to the electronic message further comprising at least one of:
   receiving an indicator that a subscriber accessed the electronic message via a link;
   receiving an indicator that a subscriber downloaded the electronic message; and
   receiving an indicator that a subscriber opened the electronic message.

7. The method of claim 1, wherein the electronic message includes an electronic message address associated with an intended recipient, the method further comprising:
   determining whether the electronic message account is a valid electronic message account for distribution including:
   determining whether the intended recipient desires to receive the electronic message using the electronic message subject-category-identifier; and
   responsive to determining the recipient does not desire to receive the electronic message, dropping the electronic message.

8. A method of distributing electronic message to subscribers of an electronic message distribution system, the method comprising:
   establishing categories for electronic message;
   registering senders of classified electronic messages, wherein a classified electronic message includes an electronic message subject-category-identifier, and wherein the senders provide sender registration information;
   associating a specific electronic message subject-category-identifier with a specific electronic message category;
   associating subscribers of the electronic message distribution system with specific categories of electronic message;
   determining if the electronic message has a message type of user generic, user specific, or conventional;
   responsive to the determination of the electronic message type, distributing the electronic message according to the message type and the electronic message subject-category-identifier,
   wherein an electronic message having the message type of user generic is distributed to all subscribers that have selected to receive messages for the subject-category identified in a recipient list of the electronic message, wherein a recipient email address for the electronic message of the message type user generic is a three level domain name and a third domain level of the recipient email address designates an action to be executed by the electronic message distribution system in distributing the electronic message;
   compiling delivery information on distributed electronic messages, the delivery information including a first percentage of electronic messages in a given subject-category that are accessed, a second percentage of the electronic messages in the given subject-category that are downloaded, and a third percentage of the electronic messages in the given subject-category that are opened by the subscribers; and
   reporting the delivery information to a sender of the distributed electronic messages, the sender being with the registered senders of the classified electronic messages.

9. The method of claim 8, wherein the electronic message is an electronic mail (e-mail) message, the method further comprising:

receiving a selection of a subject-category of e-mail messages a subscriber decides to accept; and automatically creating a sub-folder in the subscriber's e-mail account for storing the selected subject-category of e-mail messages.

10. The method of claim 8, further including:

receiving a classified electronic message;

determining the specific category of electronic message associated with the electronic message classifier of the classified electronic message;

determining whether the classified electronic message came from a registered sender; and responsive to the classified electronic message having come from a registered sender, providing at least a copy of the electronic message to a subscriber of the electronic message distribution system who is associated for the specific category of electronic message.

11. The method of claim 8, further including:

maintaining a list of subscribers who have elected to receive electronic messages having electronic message subject-category-identifiers associated with the specific electronic message category;

receiving a classified electronic message;

determining the specific category of electronic message associated with the electronic message subject-category-identifier of the classified electronic message;

determining whether the classified electronic message came from a registered sender; and responsive to the classified electronic message having come from a registered sender, providing at least a copy of the electronic message to the subscribers included in the list.

12. The method of claim 11, wherein the classified electronic message came from a specific sender and includes multiple recipient electronic message addresses having a domain that is associated with the electronic message distribution system, and further including:

providing the specific sender with a second list, wherein the second list is a list of recipient electronic message addresses that were included in the classified electronic message but are not included in the first list.

13. The method of claim 11, wherein the classified electronic message came from a specific sender and includes multiple recipient electronic message addresses having a domain that is associated with the electronic message distribution system, and further including:

providing the specific sender with a second list, wherein the second list is a list of recipient electronic message addresses that were included in the classified electronic message and are included in the first list.

14. A server for receiving an electronic message having an electronic message subject-category-identifier, the server comprising:

a hardware computer processor;

first logic for reading the electronic message subject-category-identifier;

second logic for sorting the electronic message into a category based at least upon the electronic message subject-category-identifier;

third logic for determining whether the electronic message was sent from an authorized sender of mass electronic messages;

fourth logic for determining if the electronic message has a message type of user generic, user specific, or conventional responsive to a determination that the electronic message was sent from an authorized sender;

fifth logic for distributing the electronic message according to the message type and the electronic message subject-category-identifier responsive to the determination of the electronic message type, wherein an electronic message having the message type of user generic is distributed to all subscribers that have selected to receive messages for the subject-category identified in a recipient list of the electronic message, wherein a recipient email address for the electronic message of the message type user .generic is a three level domain name and a third domain level of the recipient email address designates an action to be executed by the computer processor in distributing the electronic message;

sixth logic for compiling delivery information on distributed electronic messages, the delivery information including a first percentage of electronic messages in a given subject-category that are accessed, a second percentage of the electronic messages in the given subject-category that are downloaded, and a third percentage of the electronic messages in the given subject-category that are opened; and seventh logic for reporting the delivery information to the authorized sender of the mass electronic messages.

15. The server of claim 14, wherein the first, second, third, fourth, fifth, sixth, and seventh logic are embodied in a non-transitory computer readable medium.

16. The server of claim 14, further including:

eighth logic, embodied in a non-transitory computer readable medium, for determining when to deliver the electronic message.

17. The server of claim 14, further including:

ninth logic, embodied in a non-transitory computer readable medium, for creating folders in an electronic message account of a subscriber, wherein a given folder is associated with the electronic message subject-category-identifier.

18. The server of claim 14, further including:

tenth logic, embodied in a non-transitory computer readable medium, for delivering a notice to a given folder of an electronic message account of a subscriber that the electronic message has been received by the server, wherein the given folder is associated with the electronic message subject-category-identifier.

* * * * *